United States Patent
Fan et al.

(10) Patent No.: US 10,331,165 B2
(45) Date of Patent: Jun. 25, 2019

(54) HINGE ASSEMBLY INCLUDING AN ELASTOMER MEMBER

(71) Applicant: HEWLETT-PACKARD DEVELOPMENT COMPANY, L.P., Houston, TX (US)

(72) Inventors: Yao-Wen Fan, Taipei (TW); Kuan-Ting Wu, Taipei (TW); Cheng-Feng Liao, Taipei (TW); Chien-Ting Lin, Taipei (TW)

(73) Assignee: Hewlett-Packard Development Company, L.P., Spring, TX (US)

( * ) Notice: Subject to any disclaimer, the term of this patent is extended or adjusted under 35 U.S.C. 154(b) by 131 days.

(21) Appl. No.: 15/114,105

(22) PCT Filed: Apr. 2, 2014

(86) PCT No.: PCT/US2014/032640
§ 371 (c)(1),
(2) Date: Jul. 26, 2016

(87) PCT Pub. No.: WO2015/152911
PCT Pub. Date: Oct. 8, 2015

(65) Prior Publication Data
US 2017/0010631 A1 Jan. 12, 2017

(51) Int. Cl.
| *G06F 1/00* | (2006.01) |
| *G06F 1/16* | (2006.01) |
| *E05D 3/02* | (2006.01) |
| *E05D 5/04* | (2006.01) |
| *E05D 11/08* | (2006.01) |

(52) U.S. Cl.
CPC .............. *G06F 1/1616* (2013.01); *E05D 3/02* (2013.01); *E05D 5/04* (2013.01); *E05D 11/082* (2013.01); *G06F 1/00* (2013.01); *G06F 1/1637* (2013.01); *G06F 1/1662* (2013.01); *G06F 1/1681* (2013.01); *E05Y 2900/606* (2013.01)

(58) Field of Classification Search
CPC .... G06F 1/1616; G06F 1/1662; G06F 1/1637; G06F 1/1681; E05D 5/04; E05D 3/02; E05D 11/082; E05Y 2900/606
See application file for complete search history.

(56) References Cited

U.S. PATENT DOCUMENTS

| 4,964,193 | A | 10/1990 | Rommelfaenger et al. |
| 5,333,356 | A | 8/1994 | Katagiri |
| 5,509,176 | A | 4/1996 | Karl |
| 5,832,566 | A | 11/1998 | Quek et al. |
| 6,381,808 | B1 | 5/2002 | Kida |
| 6,648,129 | B2 | 11/2003 | Sedlacek et al. |
| 2003/0142472 | A1 | 7/2003 | Park |
| 2004/0125552 | A1 | 7/2004 | Song |
| 2007/0204433 | A1* | 9/2007 | Chang ................... G06F 1/1618 16/340 |

(Continued)

FOREIGN PATENT DOCUMENTS

EP 1174576 1/2002

*Primary Examiner* — Rick K Chang
(74) *Attorney, Agent, or Firm* — HPI Patent Department

(57) ABSTRACT

A hinge assembly includes a first bracket and a second bracket. The first bracket includes a first attachment member, a pin member and an elastomer member. The second bracket includes a second attachment member and a hollow cylinder member.

10 Claims, 7 Drawing Sheets

(56) References Cited

U.S. PATENT DOCUMENTS

| | | | |
|---|---|---|---|
| 2008/0184529 A1* | 8/2008 | Thom | E05D 11/087 16/337 |
| 2010/0275412 A1 | 11/2010 | Wang et al. | |
| 2011/0096476 A1 | 4/2011 | Choi | |
| 2011/0120742 A1 | 5/2011 | Li et al. | |
| 2013/0104341 A1 | 5/2013 | Kenerly et al. | |

* cited by examiner

HINGE ASSEMBLY INCLUDING AN ELASTOMER MEMBER

BACKGROUND

Hinge assemblies are used in computing devices such as notebook computers and laptop computers. Such hinge assemblies enable a display housing and a keyboard housing of the computing device to be rotated with respect to each other. Such a rotation may enable the computing device to be placed in 3 closed position, for example, to be carried, and an open position for example, to be used by a user.

BRIEF DESCRIPTION OF THE DRAWINGS

Non-limiting examples of the present disclosure are described in the following description, read with reference to the figures attached hereto and do not limit the scope of the claims. In the figures, identical and similar structures, elements or parts thereof that appear in more than one figure are generally labeled with the same or similar references in the figures in which they appear. Dimensions of components, layers, substrates and features illustrated in the figures are chosen primarily for convenience and clarity of presentation and are not necessarily to scale. Referring to the attached figures;

DETAILED DESCRIPTION

Hinge assemblies are used in computing devices such as notebook computers and laptop computers. Such hinge assemblies enable a display housing and a keyboard housing of the respective computing device to be rotated with respect to each other. Rotation enables the computing device to be placed in a closed, for example, to be carried. That is, the hinge assembly allows the display housing and keyboard housing to rotate toward each other. The rotation also enables the computing device to be placed in an open position, for example, to be used by a user. That is, the hinge assembly also allows the display housing and keyboard housing to rotate away from each other. However, generally, the hinge assemblies are manufactured within stringent tolerances to reduce the tendency of the rotating parts from scratching each other. According the cost of manufacturing the hinge assemblies may be increased. Further, torque created by the hinge assemblies may be non-uniform.

In examples, a hinge assembly includes a first bracket and a second bracket. The first bracket includes a first attachment member, a pin member and an elastomer member. The first attachment member attaches to a first portion of a computing device such as a display housing. The pin member is attached to the first attachment member. The elastomer member is attached to the pin member. The second bracket includes a second attachment member and a hollow cylinder member. The second attachment member attaches to a second portion of the computing device such as a keyboard housing. The hollow cylinder member receives the pin member to contact the elastomer member. The elastomer member is configured to provide uniform torque during a rotation of the first bracket with respect to the second bracket. Accordingly, the hinge assemblies may be manufactured with less stringent tolerances and torque created by the hinge assemblies may be uniform. Accordingly, the cost of manufacturing the hinge assemblies may be reduced.

Figure 1:
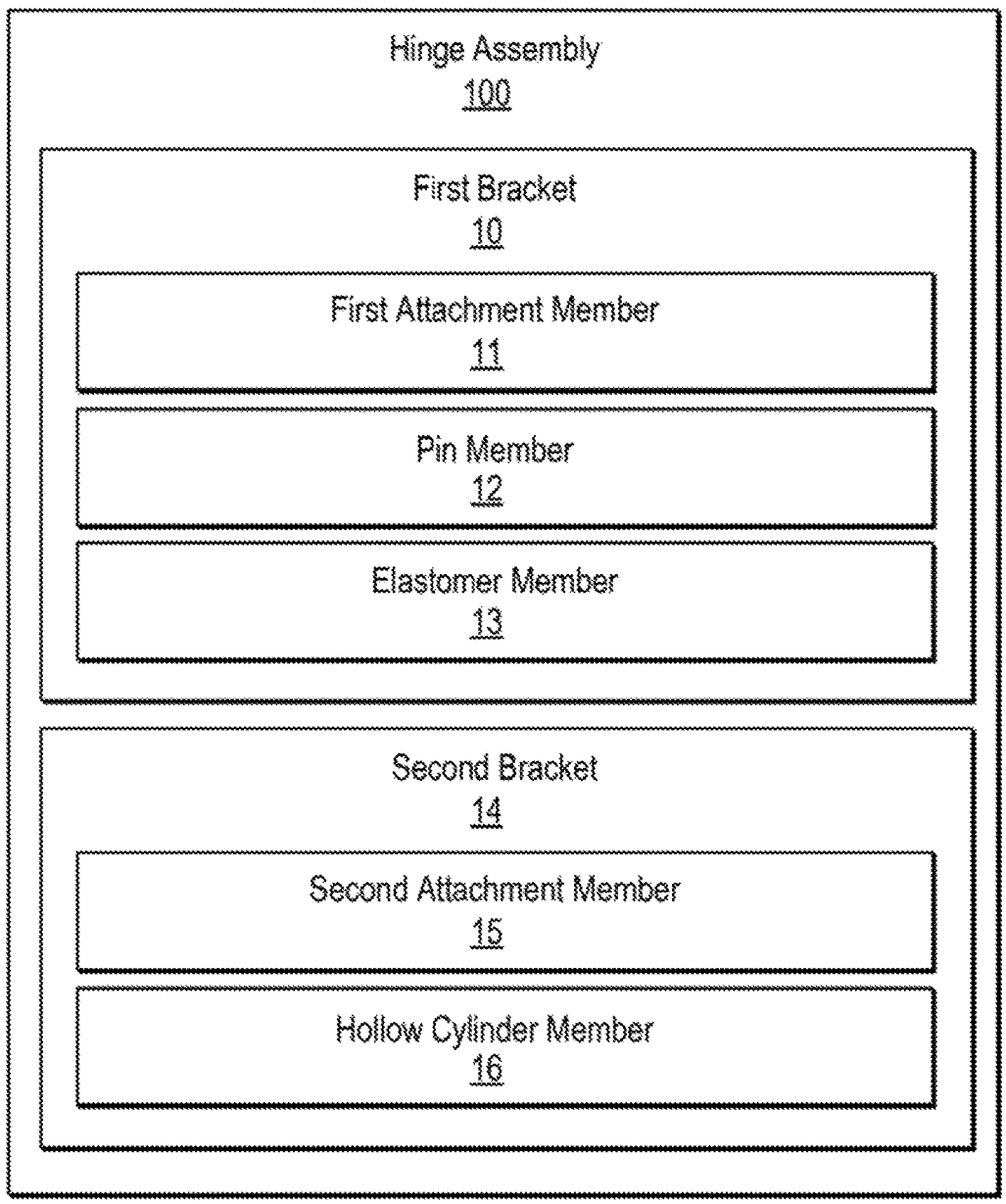
FIG. 1 is a block diagram illustrating a hinge assembly according to an example.

FIG. 1 is a block diagram illustrating a hinge assembly according to an example. The hinge assembly 100 may be usable with a computing device. Referring to FIG. 1, in some examples, the hinge assembly 100 includes a first bracket 10 and a second bracket 14. The first bracket 10 includes a first attachment member 11, a pin member 12, and an elastomer member 13. The first attachment member 11 attaches to a first portion of a computing device such as a display housing. The pin member 12 is attached to the first attachment member 11. The elastomer member 13 is attached to the pin member 12.

Referring to FIG. 1, in some examples, the second bracket 14 includes a second attachment member 15 and a hollow cylinder member 18. The second attachment member IS attaches to a second portion of the computing device such as a keyboard housing. The hollow cylinder member 18 receives the pin member 12 to contact the elastomer member 13. The elastomer member 13 is configured to provide uniform torque during a rotation of the first bracket 10 with respect to the second bracket 14. For example, the uniform torque may be created through rotation of the respective hinge brackets 10 and 14 and uniform friction provided by a frictional surface 13a of the elastomer member 13.

Figure 2:
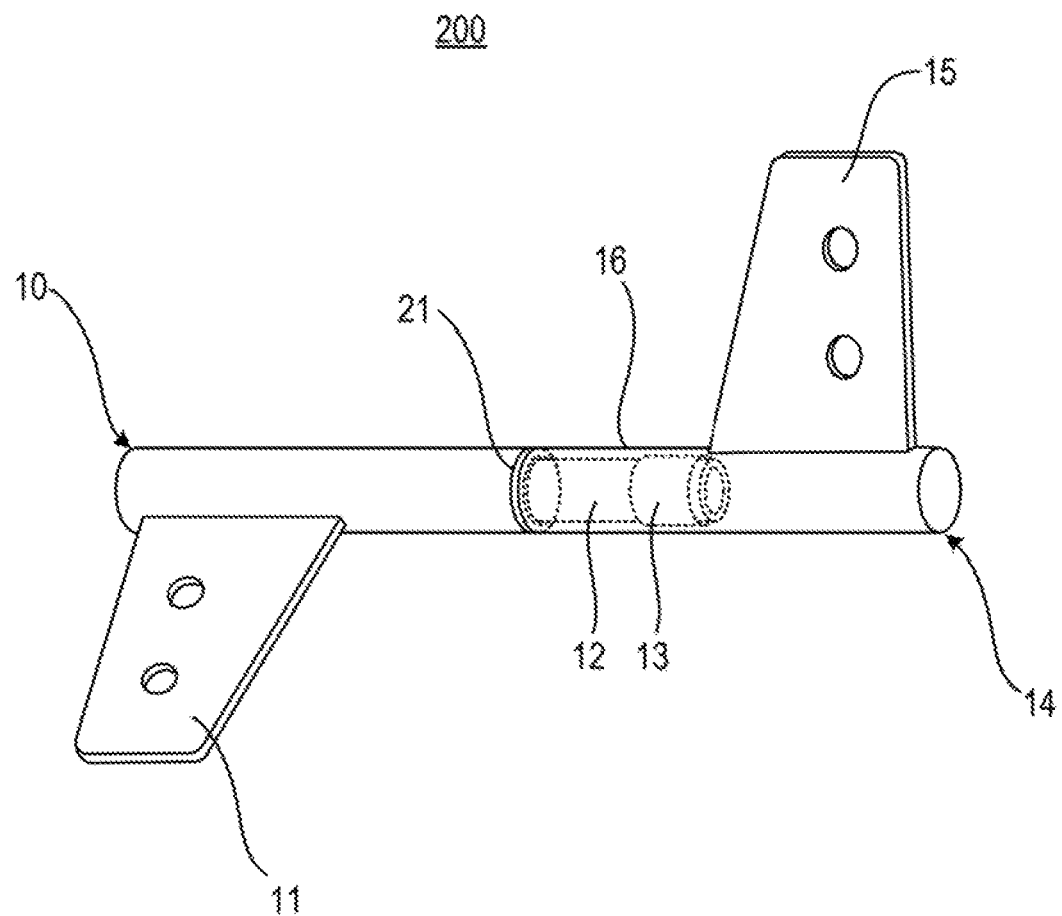
FIG. 2 is a perspective view illustrating a hinge assembly according to an example.
Figure 3:
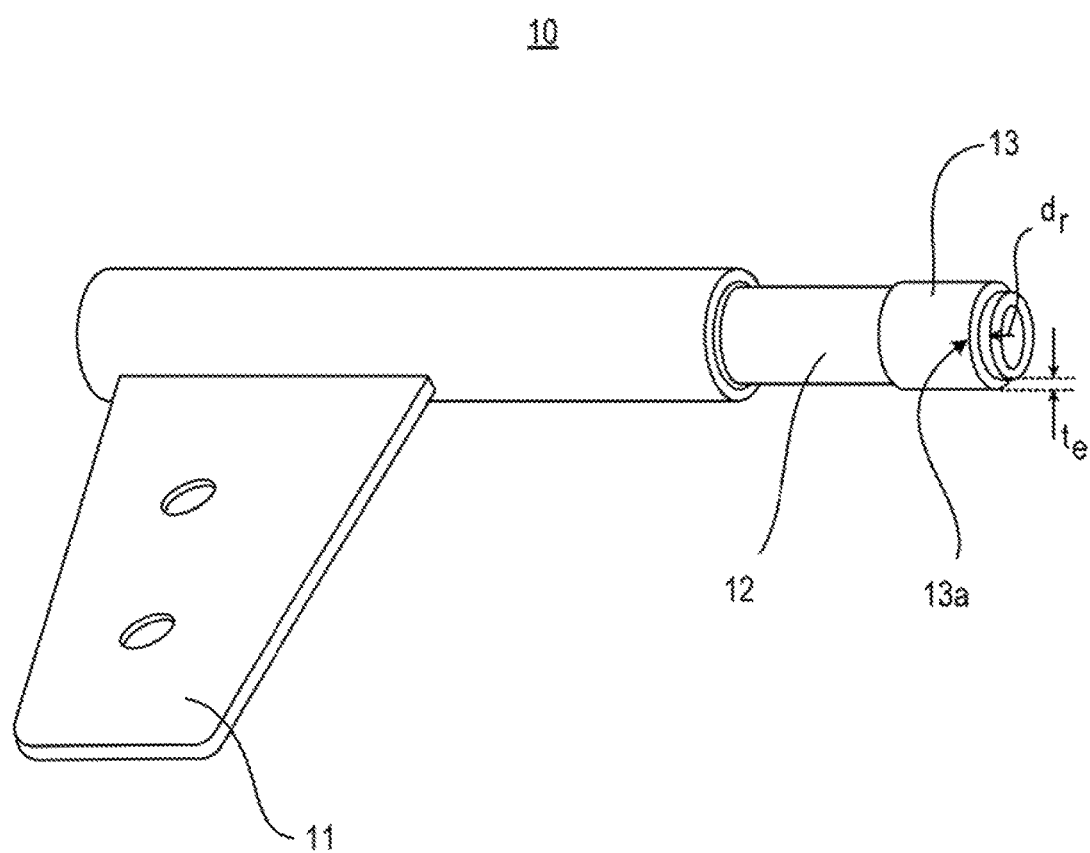
FIG. 3 is a perspective view illustrating a first bracket of the hinge assembly of FIG. 2 according to an example.

FIG. 2 is a perspective view illustrating a hinge assembly according to an example, FIG. 3 is a perspective view illustrating a first bracket of the hinge assembly of FIG. 2 according to an example. The hinge assembly 200 may include the first bracket 10 and the second bracket 14 as previously discussed with respect to the hinge assembly 100 of FIG. 1. Referring to FIGS. 2 and 3, in some examples, the hinge assembly 100 may also include an O ring 21.

Referring to FIGS. 2 and 3, in some examples, the first bracket 10 of the hinge assembly 200 includes a first attachment member 11, a pin member 12, and an elastomer member 13. In some examples, the first attachment member 11 and the pin member 12 are integrally formed as a single member. Alternatively, in some examples, the first attachment member 11 and the pin member 12 may be formed as individual members that are removably attached to each other. The second bracket 14 of the hinge assembly 200 includes a second attachment member 15 and a hollow cylinder member 18. In some examples, the second attachment member 15 and the hollow cylinder member 18 are integrally formed as a single member. Alternatively, in some examples, the second attachment member 15 and the hollow cylinder member 16 may be formed as individual members that are removably attached to each other. The first bracket 10 and the second bracket 14 may include metal such as carbon steel for example, having a steel grade of SK7, stainless steel, and the like.

Referring to FIGS. 2 and 3, the hollow cylinder member 18 receives the pin member 12 to contact the elastomer member 13. The pin member 12 may receive the O ring 21 to be removably attached thereto. For example, the O ring 21 provides the motional function at the interface of the first bracket 10 and the second bracket 14 to eliminate direct contact thereat. In some examples, the elastomer member 13 provides uniform torque during a rotation of the first bracket 10 with respect to the second bracket 14. For example, the elastomer member 13 includes a fractional surface 13a to contact and provide uniform friction with a portion of the hollow cylinder member 18. For example, the uniform torque may be created through rotation of the respective hinge brackets 10 and 14 and uniform friction provided by a frictional surface 13a of the elastomer member 13.

In some examples, the elastomer member 13 may include a thermoplastic elastomer, a thermoset elastomer, and the like. The thermoplastic elastomer may include fluoropolymer having less than 0.6 parts by weight of the elastomer member 13. The thermoplastic elastomer, for example, may include thermoplastic urethane elastomers, styrenic block copolymers, copolyether ester elastomers, polyester amide elastomers, and the like. The thermoset elastomer may include fluoropolymer having less than 0.6 parts by weight of the elastomer member 13. The thermoset elastomer, for example, may include alkyl acrylate copolymer, butadiene, chlorinated polyethylene (CPE), isobutylene-isoprene copolymer, ethylene propylene (EPM/EPDM), epiohlorhydrin (CO/ECO), fluoropolymer, hydrogenated nitrile, isoprene, chloroprene, polysulphide, nitrile, polyurethane (HNBR), polydialkylsiloxane, silicone, styrene butadiene, tetrafluoroethylene propylene, and the like.

In some examples, the coefficient of friction of the elastomer member 13 with respect to the respective bracket 14 of the hinge assembly 200 may be in a range of 0.3 to 0.7 such as 0.45 to 0.55. For example, engagement between the elastomer member 13 in the form of a thermoplastic elastomer or thermoset elastomer and the second bracket 14 in the form of carbon steel or stainless steel may result in a coefficient of friction in a range of 0.3 to 0.7. In some example, the elastomer member 13 may include a soft polymer and be in a form of an elastomer layer. The elastic layer, for example, may be formed by insert molding, adhesion, paste, and the like. In some examples, the elastomer member 13 may include a thickness $t_e$ in a radial direction $d_r$ of the pin member 12 in a range of 0.1 to 1.5 millimeters as illustrated in FIG. 3.

Figure 4:
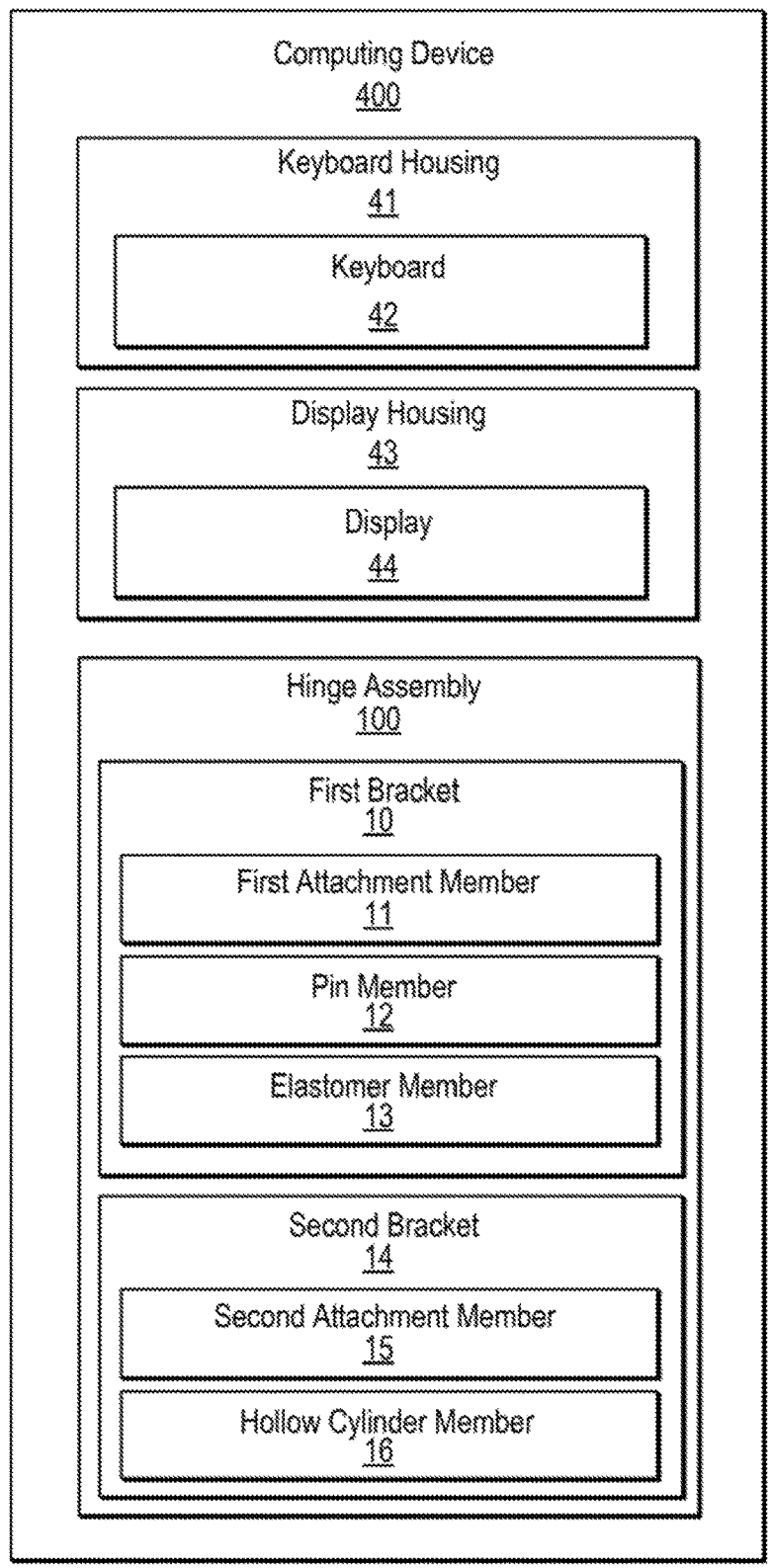
FIG. 4 is a block diagram illustrating a computing device according to an example.
Figure 5A:
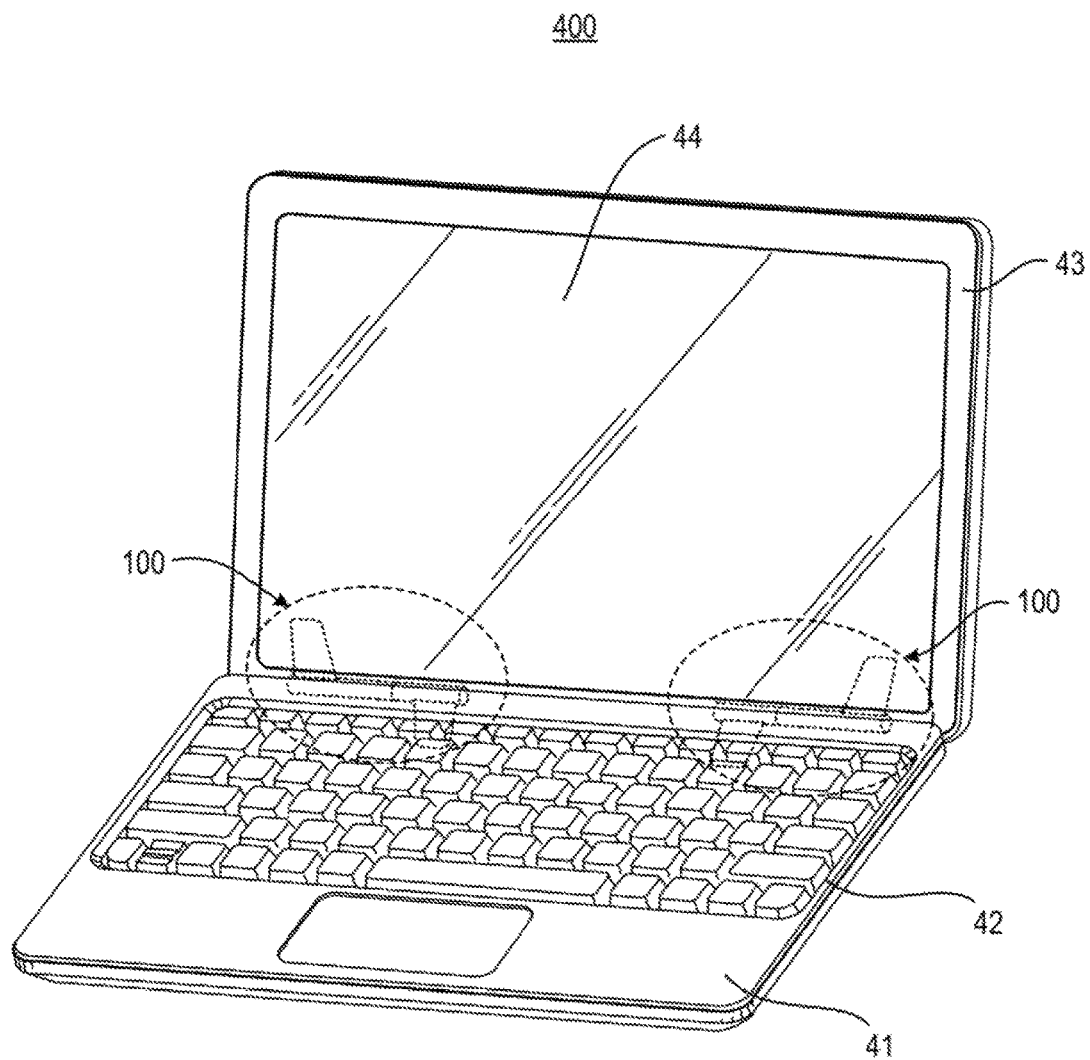
FIG. 5A is a perspective view illustrating the computing device of FIG. 4 according to an example.
Figure 5B:
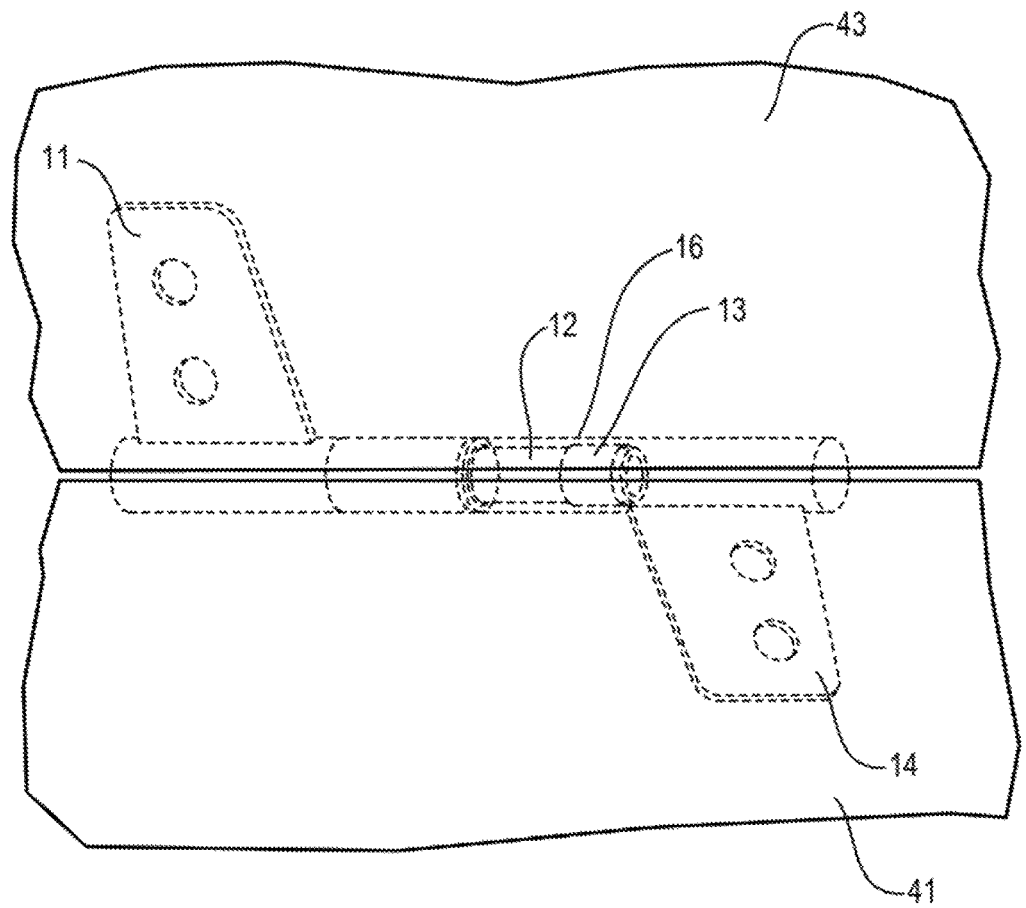
FIG. 5B is a schematic view illustrating a hinge assembly of the computing device of FIG. 5A according to an example.

FIG. 4 is a block diagram illustrating a computing device according to an example. FIG. 5A is a perspective view illustrating the computing device of FIG. 4 according to an example. FIG. 5B is a schematic view illustrating a hinge assembly of the computing device of FIG. 5A according to an example. Referring to FIGS. 4-5B, in some examples, the computing device 400 may include a keyboard housing 41, a display housing 43, and a hinge assembly 100. In some examples, the computing device 400 includes a plurality of hinge assemblies 100. The keyboard housing 41 includes a keyboard 42. The display housing 43 includes a display 44. The hinge assembly 100 rotates the keyboard housing 41 and the display housing 43 with respect to each other. The rotation enables the computing device 400 to be placed in a closed position, for example, to be carried. That is, the hinge assembly 100 allows the display housing 43 and keyboard housing 41 to rotate toward each other. The rotation also enables the computing device 400 to be placed in an open position, for example, to be used by a user. That is, the hinge assembly 100 also allows the display housing 43 and the keyboard housing 41 to rotate away from each other.

Referring to FIG. 5B, in some examples, the hinge assembly 100 may include the first bracket 10 and the second bracket 14 as previously discussed with respect to FIG. 1. That is, the hinge assembly 100 may include a first bracket 10 including a first attachment member 11 to attach to the display housing 43, a pin member 12 attached to the first attachment member 11, and an elastomer member 13 attached to the pin member 12. The hinge assembly 100 may also include a second bracket 14 including a second attachment member 15 to attach to the keyboard housing 41, and a hollow cylinder member 18 to receive the pin member 12 and to contact the elastomer member 13. The elastomer member 13 includes a motional surface 13a to provide uniform friction with the hollow cylinder member 18, and to provide uniform torque during a rotation of the first bracket 10 with respect to the second bracket 14.

Figure 6:
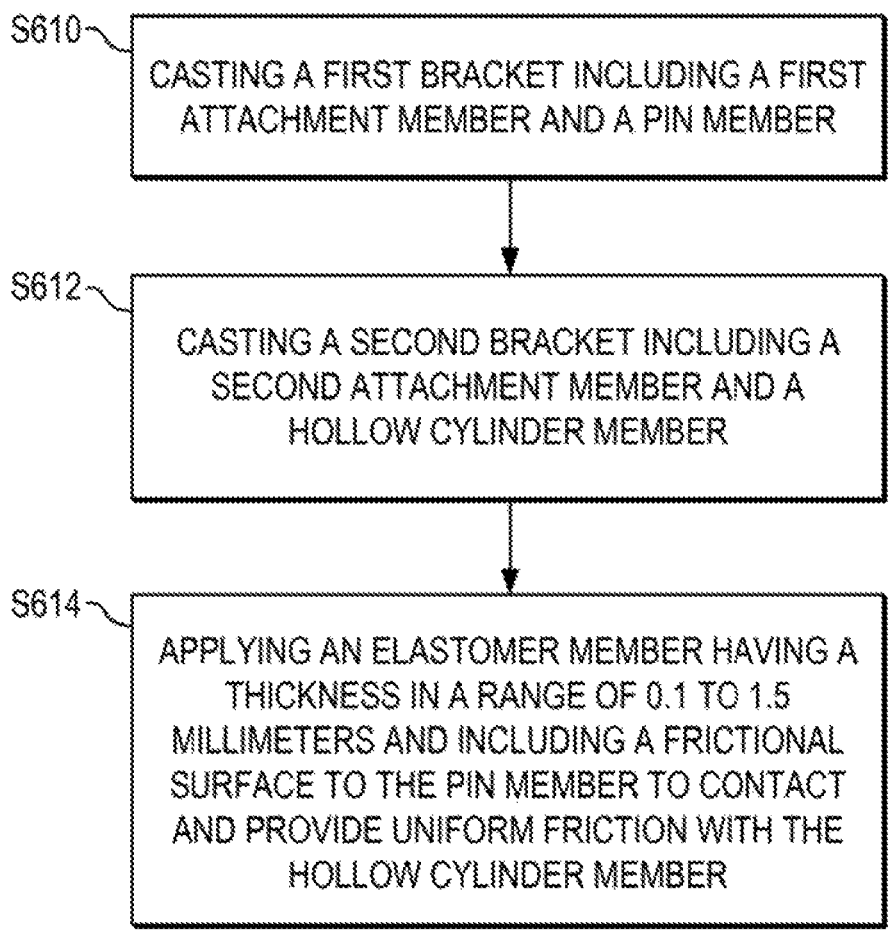
FIG. 6 is a flowchart illustrating a method of manufacturing a hinge assembly according to an example.

FIG. 6 is a flowchart illustrating a method of manufacturing a hinge assembly according to an example, in some examples, the modules and/or assemblies implementing the method may be those described in relation to the hinge assemblies 100 and 200 of FIGS. 1-5B. Referring to FIG. 6, in block S610, a first bracket including a first attachment member and a pin member is casted in some examples, the first attachment member and the pin member may be casted as an integrally-formed, single member. Alternatively, the first attachment member and the pin member may be casted as individual members that are removably attached to each other, in block S612, a second bracket including a second attachment member and a hollow cylinder member is casted. In some examples, the second attachment member and the hollow cylinder member may be casted as an integrally-formed, single member. Alternatively, the second attachment member and the hollow cylinder member may be casted as individual members that are removably attached to each other.

In block S614, an elastomer member having a thickness in a range of 0.1 to 1.5 millimeters and including a frictional surface is applied to the pin member to contact and provide uniform friction with the hollow cylinder member. In some examples, the elastomer member is applied to the pin member by insert molding. Alternatively, the elastomer member is applied to the pin member by adhesion and/or in a form of paste. For example, the elastomer member may be in the form of an adhesive tape and attach to the pin member by adhesion. In some examples, the elastomer member is configured to provide uniform torque during a rotation of the first bracket with respect to the second bracket. For example, the uniform torque may be created through rotation of the respective hinge brackets and uniform friction provided by a frictional surface of the elastomer member.

It is to be understood that the flowchart of FIG. 6 illustrates architecture, functionality, and/or operation of examples of the present disclosure, if embodied in software, each block may represent a module, segment, or portion of code that includes one or more executable instructions to implement the specified logical function(s). If embodied in hardware, each block may represent a circuit or a number of interconnected circuits to implement the specified logical function(s). Although the flowchart, of FIG. 6 illustrates a specific order of execution, the order of execution may differ from that which is depicted. For example, the order of execution of two or more blocks may be rearranged relative to the order illustrated. Also, two or more blocks illustrated in succession in FIG. 6 may be executed concurrently or with partial concurrence. All such variations are within the scope of the present disclosure.

The present disclosure has been described using non-limiting detailed descriptions of examples thereof and is not intended to limit the scope of the present disclosure. It should be understood that features and/or operations described with respect to one example may be used With other examples and that not all examples of the present disclosure have all of the features and/or operations illustrated in a particular figure or described with respect to one of the examples. Variations of examples described will occur to persons of the art. Furthermore, the terms "comprise," "include," "have" and their conjugates, shall mean, when used in the present disclosure and/or claims, "including but not necessarily limited to."

It is noted that some of the above described examples may include structure, acts or details of structures and acts that may not be essential to the present disclosure and are intended to be exemplary. Structure and acts described herein are replaceable by equivalents, which perform the same function, even if the structure or acts are different, as known in the art. Therefore, the scope of the present disclosure is limited only by the elements and limitations as used in the claims.

What is claimed is:

1. A hinge assembly usable with a computing device, the hinge assembly comprising:
   a first bracket including:
      a body member;
      a first attachment member extending from the body member to make direct contact with and attach to a first portion of the computing device;
      a pin member extending from the body member orthogonally to the first attachment member; and
      an elastomer member attached to the pin member; and
   a second bracket including:
      a second attachment member to make direct contact with and attach to a second portion of the computing device and not to the first portion of the computing device; and
      a hollow cylinder member from which the second attachment member extends, into which the pin member and the elastomer member are completely insertable, and to contact the elastomer member; and
   wherein the elastomer member is configured to provide uniform torque during a rotation of the first bracket with respect to the second bracket.

2. The hinge assembly of claim 1, wherein the elastomer member comprises one of a thermoplastic elastomer and a thermoset elastomer.

3. The hinge assembly of claim 1, wherein the elastomer member includes a frictional surface to contact and provide uniform friction with the hollow cylinder member.

4. The hinge assembly of claim 1, wherein the elastomer member is in a form of an elastomer layer.

5. The hinge assembly of claim 1, wherein the elastomer member includes a thickness in a radial direction of the pin member in a range of 0.1 to 1.5 millimeters.

6. The hinge assembly according to claim 1, wherein the elastomer member is a soft polymer.

7. The hinge assembly of claim 1, further comprising:
   an O ring to removably attach to the pin member.

8. The hinge assembly of claim 1, wherein the first attachment member, the body member, and the pin member are integrally formed as a single member.

9. The hinge assembly of claim 1, wherein the second attachment member and the hollow cylinder member are integrally formed as a single member.

10. The hinge assembly of claim 1, wherein the first bracket and the second bracket comprise metal.

* * * * *